(12) United States Patent
Shell

(10) Patent No.: US 10,653,157 B2
(45) Date of Patent: May 19, 2020

(54) SYSTEMS AND METHODS FOR VACUUM CHILLING POULTRY PRODUCTS

(71) Applicant: Morris & Associates, Inc., Garner, NC (US)

(72) Inventor: John P. Shell, Raleigh, NC (US)

(73) Assignee: Morris & Associates, Inc., Garner, NC (US)

( * ) Notice: Subject to any disclaimer, the term of this patent is extended or adjusted under 35 U.S.C. 154(b) by 0 days.

(21) Appl. No.: 16/302,176

(22) PCT Filed: May 18, 2017

(86) PCT No.: PCT/US2017/033355
§ 371 (c)(1),
(2) Date: Nov. 16, 2018

(87) PCT Pub. No.: WO2017/201303
PCT Pub. Date: Nov. 23, 2017

(65) Prior Publication Data
US 2019/0274320 A1   Sep. 12, 2019

Related U.S. Application Data

(60) Provisional application No. 62/338,179, filed on May 18, 2016.

(51) Int. Cl.
| | |
|---|---|
| *A22C 21/00* | (2006.01) |
| *A22B 7/00* | (2006.01) |
| *B65G 15/30* | (2006.01) |
| *A23B 4/16* | (2006.01) |
| *A23L 3/015* | (2006.01) |
| *A23B 4/06* | (2006.01) |
| *F25D 31/00* | (2006.01) |

(52) U.S. Cl.
CPC .......... *A22C 21/0053* (2013.01); *A22B 7/008* (2013.01); *A22C 21/00* (2013.01); *A23B 4/064* (2013.01); *A23B 4/16* (2013.01); *A23L 3/0155* (2013.01); *B65G 15/30* (2013.01); *F25D 31/00* (2013.01); *B65G 2201/0202* (2013.01)

(58) Field of Classification Search
CPC ........................... A22C 21/00; A22C 21/0053
USPC ................................................... 452/177, 178
See application file for complete search history.

(56) References Cited

U.S. PATENT DOCUMENTS

| | | |
|---|---|---|
| 2,787,141 A | 4/1957 | Julius |
| 3,423,950 A | 1/1969 | Reynolds |
| 4,942,053 A | 7/1990 | Franklin et al. |

(Continued)

OTHER PUBLICATIONS

International Search Report and Written Opinion for PCT/US2017/033355 dated Jun. 29, 2017, 9 pages.

*Primary Examiner* — Richard T Price, Jr.
(74) *Attorney, Agent, or Firm* — Myers Bigel, P.A.

(57) ABSTRACT

A system for vacuum chilling poultry product includes: a vacuum chamber configured to be evacuated to chill poultry product in the vacuum chamber; at least one inclined or vertical conduit coupled to the vacuum chamber, with the at least one conduit configured to hold at least one water seal when the vacuum chamber is evacuated; and a conveying mechanism that is configured to continuously convey the poultry product upwardly through the at least one conduit, then into and through the vacuum chamber, and then downwardly through the at least one conduit.

29 Claims, 7 Drawing Sheets

(56) References Cited

U.S. PATENT DOCUMENTS

| | | | | |
|---|---|---|---|---|
| 5,114,380 A | * | 5/1992 | Larsen | A22B 5/0094 128/DIG. 25 |
| 6,796,892 B2 | * | 9/2004 | Allen | A22B 5/00 452/106 |
| 8,376,815 B1 | * | 2/2013 | Parker | A22C 9/002 452/141 |
| 8,684,799 B2 | * | 4/2014 | Brink | A22C 21/0061 452/173 |

* cited by examiner

SYSTEMS AND METHODS FOR VACUUM CHILLING POULTRY PRODUCTS

RELATED APPLICATIONS

This application is a 35 U.S.C. § 371 national phase application of PCT International Application No. PCT/US2017/033355, filed May 18, 2017, which claims priority from U.S. Provisional Application No. 62/338,179, filed May 18, 2016, the disclosure of each of which is incorporated by reference in its entirety.

BACKGROUND

In the United States, federal regulations require that poultry products be chilled soon after slaughter and evisceration. While the regulations have recently been rewritten to provide the processor more flexibility, the previous prescriptive requirement is still presumed to be sufficient and provides a useful frame of reference for the process. The previous regulation required the internal bird temperature to be reduced to 40° F. or less within 4 to 16 hours of slaughter depending on bird weight and chilling method. Some processors adopt a lower target temperature in order to achieve commercial goals such as improved shelf life. This invention addresses reducing the temperature of products that may be whole eviscerated birds or any part thereof or bird giblets or other non-poultry products such as pork carcasses or beef tongues.

Commercial considerations also drive processors to effect chilling in a shorter timeframe than the regulatory guidance. In general, longer chilling times require more product to be resident in the chiller, and consequently the equipment must be larger. Not only is larger equipment more costly, it takes up more room in the plant and consequently increases the facility cost.

In addition to capital considerations, longer chilling times also complicate operations. Processors must schedule operations that occur before chilling such as evisceration and operations after chilling such as cut-up with sufficient delay for the chilling operation. Some processing facilities are on a 24 hour cycle with two shifts for processing followed by cleanup on third shift. For such operations, there is no more time available in the day to allocate for chilling.

There has been a sustained trend in the poultry industry toward increasingly large birds. Birds in excess of 10 pound live weight are now quite common. Due to the thickness of the meat, these large birds take longer to chill than smaller birds would in the same chilling equipment. This trend has created incentives for new technology that can reduce the chilling time.

Consider first the conduction of heat from the interior of the product (e.g., carcass) to the surface. It is well known that the conductive heat transfer rate between two points in a solid body is generally proportional to the difference in temperature between those points. Thus, the heat transfer rate from, for example, a point inside the breast muscle to the skin adjacent this muscle is proportional to the difference in temperature between those places. The actual rate further depends upon the thermal conductivity of the material (in this case muscle tissue) as well as the specific heat and mass density since the process is transient. The initial temperature at the center of the muscle is about 104° F. which is the nominal body temperature of chickens. Neither the initial temperature nor the thermal properties of the product can be altered. Thus, the only way to increase heat transfer and reduce the chilling time is to reduce the temperature at the surface of the product. This part of the theoretical problem is common to all chilling methods.

The method used for chilling the product determines how heat is transferred away from the surface of the product. Two chilling methods are well documented in the prior art: immersion chilling and air chilling.

The immersion chilling method causes the hot product to be submerged in chilled water or a mixture of water and ice. In the chiller, heat is removed from the surface of the product by convection of the chilling medium. Heat moves from the interior of the meat to the surface by conduction. The product remains in the chiller for a sufficient length of time so that the interior temperature is reduced to the target level. Over time, a variety of methods have been developed for controlling the length of time individual products remain immersed and these methods have come to be recognized as chiller types such as rocker chillers, drag chillers and auger chillers.

Within each type of immersion chiller, various techniques have evolved for increasing the convective heat transfer coefficient between the product surface and the body of water. However, even at very high convective coefficients, the surface temperature of a product in an immersion chilling system cannot be less than 32° F., since the water would freeze below that point and cannot be circulated about the product.

This inherent limitation of immersion chilling is significant, because in many cases the target for the interior temperature is only 36° F. This provides a temperature difference of only 4° F. within the product during the final stages of chilling. Such a small differential slows the chilling process.

The air chilling method sees individual products suspended in a chamber in which cold air is circulated around the product. Air does not suffer the temperature limitation of water; however, the convective heat transfer coefficient achievable with air is much lower than for water. Further, if the air temperature is too low, exposed parts of the product such as wings may freeze before heavier parts such as breast meat gets cold. In general, air chilling takes longer than immersion chilling.

It should be noted that a substantial part of the convective heat transfer in air chilling results from evaporation of water from the surface of the product.

In both immersion chilling and air chilling, heat transfer from the inner surface of the product—for instance the surface facing the organ cavity in a carcass—is limited by the difficulty of circulating the chilling medium through this cavity.

The present invention introduces the use of vacuum chilling to remove heat from the surface of product. The primary mode of heat transfer is evaporation at the surface. Vacuum chilling does not suffer the temperature limits of immersion chilling and enjoys higher heat transfer rates than air chilling.

There is no prior art known to the inventor related to using vacuum chilling for poultry or other meat products. Vacuum chilling has been used to remove field heat from certain fruits and vegetables to improve quality and extend shelf life. Typically, the process is operated in batch mode in which palletized produce is loaded into vacuum chambers which are sealed and then evacuated. Pressure is held at a very low level for a period of time, and then air is allowed back into the chamber and the produce is removed. Operating pressures are reduced to the flash point where water boils at the temperature of the product. This type of operation is well suited for products that are already batched into boxes and pallets. Also, the equipment is usually portable for moving from farm to farm as the growing season progresses.

Vacuum chilling is also used for other applications such as making ice.

SUMMARY

Some embodiments of the present invention are directed to a system for vacuum chilling edible animal product such as poultry product. The system includes: a vacuum chamber configured to be evacuated to chill poultry product in the vacuum chamber; at least one inclined or vertical conduit coupled to and/or communicating with the vacuum chamber, with the at least one conduit configured to hold at least one water seal when the vacuum chamber is evacuated; and a conveying mechanism that is configured to continuously convey the poultry product upwardly through the at least one conduit, then into and through the vacuum chamber, and then downwardly through the at least one conduit.

The at least one conduit may include an inclined or vertical inlet conduit at a first end portion of the system extending upwardly to the vacuum chamber and an inclined or vertical outlet conduit at a second end portion of the system extending downwardly from the vacuum chamber. The at least one water seal may include an inlet water seal and an outlet water seal. The inlet conduit may be configured to hold the inlet water seal when the vacuum chamber is evacuated. The outlet conduit may be configured to hold the outlet water seal when the vacuum chamber is evacuated. The conveying mechanism may be configured to continuously convey the poultry product upwardly through the inlet conduit, then into and through the vacuum chamber, and then downwardly through the outlet conduit.

In some embodiments, the system includes: a first water seal tank at the first end portion of the system and configured to hold the inlet water seal when the vacuum chamber is evacuated; and/or a second water seal tank at the second end portion of the system and configured to hold the outlet water seal when the vacuum chamber is evacuated.

In some embodiments, the system includes: a pump configured to transfer water from the second water seal tank to the outlet conduit; and/or a heat exchanger configured to cool the water transferred from the second water seal tank to the outlet conduit.

In some embodiments, the system includes a cooling jacket surrounding at least a portion of the inlet conduit and/or the outlet conduit to cool water held therein.

In some embodiments, the system includes a pump configured to transfer water from the second water seal tank to one or more nozzles at the vacuum chamber. The one or more nozzles may be configured to spray the water transferred from the second water seal tank onto poultry product being conveyed through the vacuum chamber.

In some embodiments, the pressure in the vacuum chamber is controlled such that water boils at a target temperature of between 26 to 32° F.

In some embodiments, the system includes a vacuum pump configured to evacuate the vacuum chamber.

In some embodiments, the system includes a condenser plate configured to receive refrigerant therethrough in the vacuum chamber. The condenser plate may be continuous or segmented and may extend along at least a major portion of a length of the vacuum chamber.

The inlet conduit may include a first inlet conduit and a second inlet conduit with an intermediate inlet passageway disposed therebetween and communicating with each of the first and second inlet conduits. The inlet water seal may include a first inlet water seal and a second inlet water seal. The first inlet conduit may be configured to hold the first inlet water seal when the vacuum chamber is evacuated. The second inlet conduit may be configured to hold the second inlet water seal when the vacuum chamber is evacuated. The outlet conduit may include a first outlet conduit and a second outlet conduit with an intermediate outlet passageway disposed therebetween and communicating with each of the first and second outlet conduits. The outlet water seal may include a first outlet water seal and a second outlet water seal. The first outlet conduit may be configured to hold the first outlet water seal when the vacuum chamber is evacuated. The second outlet conduit may be configured to hold the second outlet water seal when the vacuum chamber is evacuated. The conveying mechanism may be configured to continuously convey the poultry product upwardly through the first inlet conduit, then downwardly through the intermediate inlet passageway, then upwardly through the second inlet conduit, then into and through the vacuum chamber, then downwardly through the second outlet conduit, then upwardly through the intermediate outlet passageway, and then downwardly through first outlet conduit. The system may include at least one pressure regulator configured to reduce a pressure in each of the intermediate inlet and outlet passageways.

In some embodiments, the conveying mechanism includes a shackle line or rail supporting a plurality of shackles.

In some embodiments, the system includes a dip tank for holding water in the vacuum chamber. The conveying mechanism may convey the poultry product downwardly in the vacuum chamber such that the poultry product passes through the water in the dip tank.

In some embodiments, the system includes a poultry product source including poultry product that is configured to be received at or on the conveying member.

The at least one conduit may include a first conduit and a second conduit with an intermediate passageway disposed therebetween and communicating with each of the first and second inlet conduits. The at least one water seal may include a first water seal and a second water seal. The first conduit may be configured to hold the first water seal when the vacuum chamber is evacuated. The second conduit may be configured to hold the second water seal when the vacuum chamber is evacuated. The conveying mechanism may be configured to continuously convey the poultry product upwardly through the first conduit, then downwardly through the intermediate passageway, then upwardly through the second conduit, then into and through the vacuum chamber, then downwardly through the second conduit, then upwardly through the intermediate passageway, and then downwardly through first conduit.

Some other embodiments of the present invention are directed to a method for vacuum chilling edible animal product such as poultry product in a continuous mode. The method includes: evacuating a vacuum chamber; conveying the poultry product up at least one inclined or vertical inlet conduit holding at least one water seal; then conveying the poultry product into and through the vacuum chamber that is coupled to and/or communicating with the at least one conduit to chill the poultry product; and then conveying the chilled poultry product down the at least one conduit.

The at least one conduit may include an inclined or vertical inlet conduit extending upwardly to the vacuum chamber and an inclined or vertical outlet conduit extending downwardly from the vacuum chamber. The at least one water seal may include an inlet water seal held in the inlet conduit and an outlet water seal held in the outlet conduit. The method may include: conveying the poultry product up the inlet conduit; then conveying the poultry product into and through the vacuum chamber; and then conveying the chilled poultry product down the outlet conduit.

In some embodiments, the method includes: conveying the poultry product through an inlet water seal tank holding the inlet water seal before conveying the poultry product up the inlet conduit; and/or conveying the chilled poultry product through an outlet water seal tank holding the outlet water seal after conveying the poultry product down the outlet conduit.

In some embodiments, the method includes: pumping water from the outlet water seal tank to the outlet conduit; and/or flowing the water through a heat exchanger between the outlet water seal tank and the outlet conduit to cool the water.

In some embodiments, the method includes: pumping water from the outlet water seal tank to one or more spray nozzles at the vacuum chamber; and/or spraying the water from the one or more spray nozzles onto the poultry product in the vacuum chamber.

In some embodiments, the method includes maintaining the pressure in the vacuum chamber such that water boils at a target temperature of between 26 to 32° F.

The inlet conduit may include a first inlet conduit and a second inlet conduit with an intermediate inlet passageway disposed therebetween and communicating with each of the first and second inlet conduits. The inlet water seal may include a first inlet water seal held in the first inlet conduit and a second inlet water seal held in the second inlet conduit. The outlet conduit may include a first outlet conduit and a second outlet conduit with an intermediate outlet passageway disposed therebetween and communicating with each of the first and second outlet conduits. The outlet water seal may include a first outlet water seal held in the first outlet conduit and a second outlet water seal held in the second outlet conduit. The method may include: conveying the poultry product up through the first inlet conduit; then conveying the poultry product down through the intermediate inlet passageway; then conveying the poultry product up through the second inlet conduit; then conveying the poultry product up through the second inlet conduit; then conveying the poultry product into and through the vacuum chamber; then conveying the chilled poultry product down through the second outlet conduit; then conveying the chilled poultry product up through the intermediate outlet passageway; and then conveying the chilled poultry product down through first outlet conduit.

The at least one conduit may include a first conduit and a second conduit with an intermediate passageway disposed therebetween and communicating with each of the first and second inlet conduits. The at least one water seal may include a first water seal held in the first conduit and a second water seal held in the second conduit. The method may include: conveying the poultry product up through the first conduit; then conveying the poultry product down through the intermediate passageway; then conveying the poultry product up through the second conduit; then conveying the poultry product into and through the vacuum chamber; then conveying the chilled poultry product down through the second conduit; then conveying the chilled poultry product up through the intermediate passageway; and then conveying the chilled poultry product down through the first conduit.

Some other embodiments are directed to a method for vacuum chilling edible animal product such as poultry product in a batch mode. The method may include providing a vacuum chilling system including: a poultry product source; a plurality of vacuum chambers including first and second vacuum chambers; and a conveying mechanism such as a shackle line configured to convey poultry product from the poultry product source into and through each of the plurality of vacuum chambers. The method may include: routing poultry product from the poultry product source into the first vacuum chamber using the shackle line; closing the first vacuum chamber to seal the first vacuum chamber and enclose the poultry product in the first vacuum chamber; evacuating the first vacuum chamber to vacuum chill the poultry product in the first vacuum chamber; while evacuating the first vacuum chamber, routing poultry product from the poultry source into the second vacuum chamber using the shackle line; and evacuating the second vacuum chamber to vacuum chill the poultry product in the second vacuum chamber.

The method may include, after the poultry product in the first vacuum chamber has been chilled to a predetermined temperature: opening the first vacuum chamber; and/or routing the chilled poultry product away from the first vacuum chamber using the shackle line. The predetermined temperature may be less than about 36° F.

In some embodiments, the steps of evacuating the second vacuum chamber and routing the chilled poultry product away from the first vacuum chamber may be performed concurrently.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1:
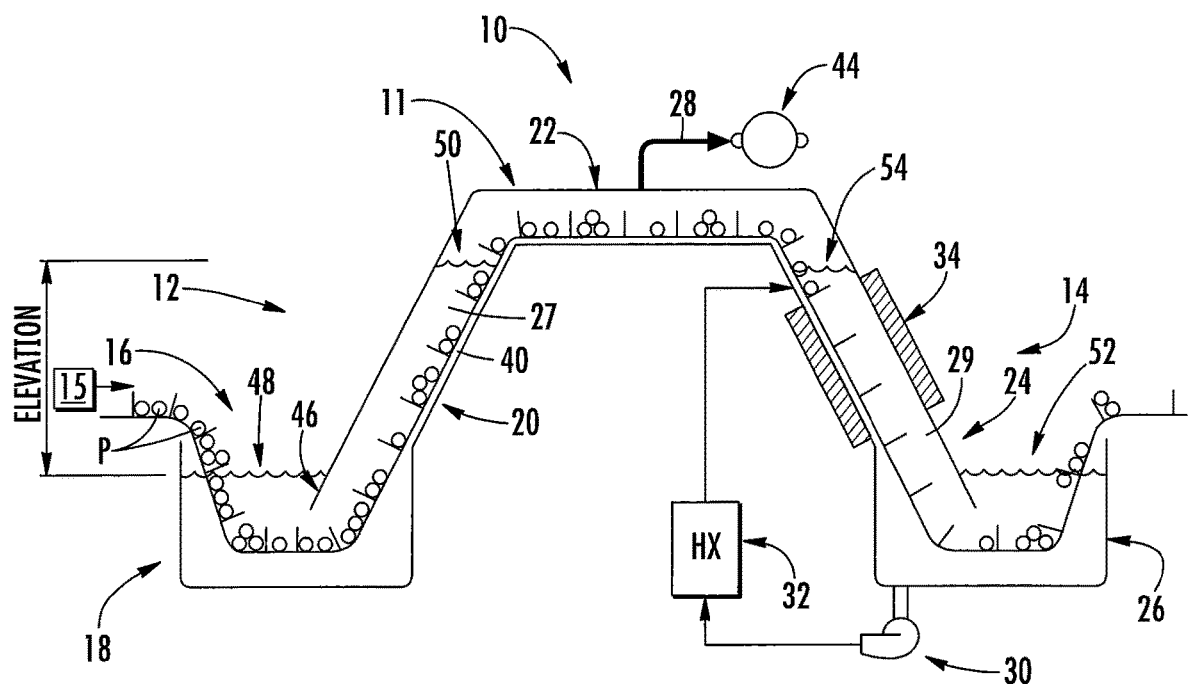
FIG. 1 is a schematic illustration of a vacuum chiller system according to some embodiments.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "includes," "comprising," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, a "water seal" is a quantity of water suitably contained to allow solid products and components to pass through the water, but substantially blocking the passage of gas or vapor therethrough. There may be a difference in pressure between gas or vapor on opposing sides of a water seal.

As used herein, "water" may be pure water or water intentionally mixed with other substances to achieve certain desired properties or water incidentally contaminated with other substances.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner.

These and other objects and/or aspects of the present invention are explained in detail in the specification set forth below.

The present invention uses vacuum chilling to remove heat from the surface of product. The primary mode of heat transfer is evaporation at the surface. Evaporative heat transfer rates are higher in the vacuum chilling system than in air chilling, because the method of moving water away from the surface is different. In air chilling, water vapor moves by diffusion through air. In the vacuum system, there is no air, and water vapor moves by pressure gradient which is much faster. The invention may be embodied as either a continuous process or a batch process.

A continuous vacuum chiller or vacuum chiller system 10 is illustrated in FIG. 1. The system includes inlet and outlet end portions 12, 14. The system includes a continuous conveying mechanism, for example a conveyor line 16 such as a belt 40 or shackle line 42 (FIG. 6), that conveys poultry products through the chiller from the inlet end portion 12 to the outlet end portion 14. More specifically, the conveyor 16 may convey product P from a poultry product source 15 through an inlet water seal tank 18, up a first or inlet conduit 20, through a vacuum chamber 22, down a second or outlet conduit 24 and through an outlet water seal tank 26.

A vacuum pump 44 or equivalent device is configured to evacuate the vacuum chamber 22 through a vacuum line 28. Vertical water seals 27, 29 at the inlet and the outlet end portions 12, 14, respectively, contain the vacuum. The inlet water seal 27 includes a lower water level 48 and an upper water level 50. The outlet water seal 29 includes a lower water level 52 and an upper water level 54.

The seals 27, 29 extend up the first (inlet) and second (outlet) conduits 20, 24, respectively, with at least 34 feet of elevation gain. Due to the pressure differential between ambient atmosphere and the vacuum chamber, the water level on the vacuum side of the conduits 20, 24 is approximately 404 inches higher than the atmospheric side of the conduits 20, 24 and/or the seal tanks 18, 26 when the atmosphere is at nominal sea-level pressure.

A U-trap or inverted weir 46 is in each of the inlet and outlet seal tanks 18, 26 to contain the water in the seal conduits. The inlet and outlet seal tanks 18, 26 have capacity to hold the full volume of seal water when the vacuum is not applied.

The conveyor 16 enters the chiller at the atmospheric (short or low) side of the inlet water seal 27. The conveyor 16 passes under the weir 46 and up through the water in the first conduit 20 and emerges into the vacuum chamber 22 at the top.

According to some embodiments, in the vacuum chamber 22, the conveyor 16 may follow a serpentine or other non-straight path to make efficient use of the space and to maximize the amount of product resident in the vacuum chamber 22.

As described in more detail below, the vacuum chamber may be fitted with spray nozzles 38 or the like to keep the surfaces of the product moist. Alternatively, the conveyor 16 may periodically dip through a dip tank or water trough 56 (FIG. 6) in the vacuum chamber 22 to wet the product.

Pressure in the vacuum chamber 22 is controlled so that water boils at a target temperature. The target temperature will generally be in the range of 26 to 32° F. Temperatures much lower will risk freezing the wings. Higher temperatures fail to fully utilize the advantages of the technology. However, temperatures as high as 36° F. may still be effective. Other temperatures may be appropriate for non-poultry products. At an operating temperature of 28° F., the difference between interior temperature and surface temperature would be 8° F. for a target interior temperature of 36° F. Thus, the heat transfer rate at the end of the process would be twice as fast as for immersion chilling. The difference in heat transfer rates during the early stages of chilling is less dramatic.

The conveyor 16 exits the vacuum chamber 22 through the water column in the exit seal 29 that is generally identical to the inlet seal 27 except that the conveyor 16 enters at the high end and exits at the low end. It is contemplated that the system can be designed with a single seal, with the conveyor entering and exiting in parallel runs through the same conduit.

Figure 4:
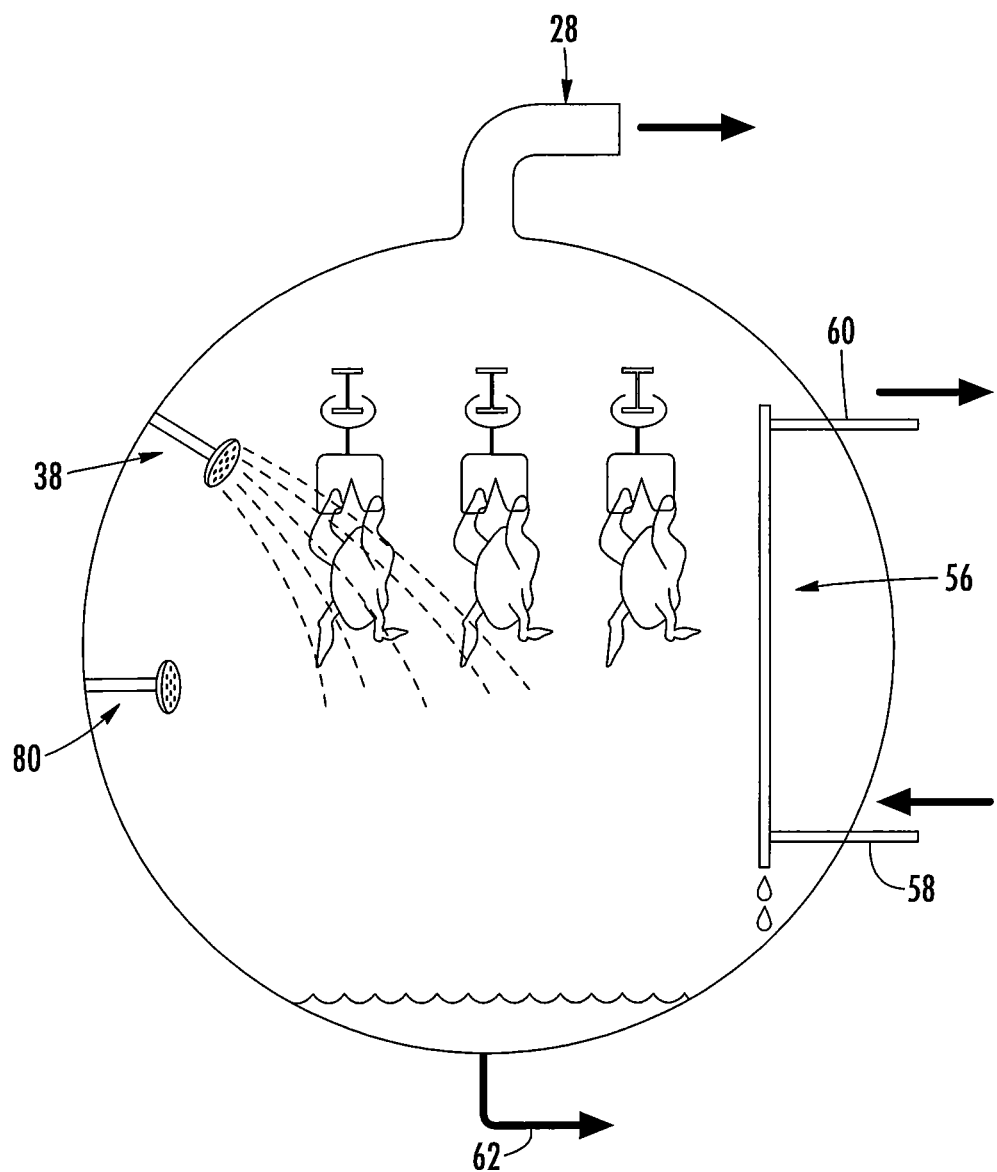
FIG. 4 is an end section view of a vacuum chamber of the chiller system of FIG. 1 according to some embodiments.

Although a vacuum pump connected to vacuum line 28 has been described in reference to FIG. 1, it is contemplated that vacuum could be pulled using a mechanical pump, a steam eductor and/or a refrigerated condenser for condensing water vapor. In FIG. 4, a condenser 56 is illustrated inside the vacuum chamber 22. Refrigerant is supplied to the condenser through an inlet line 58 and removed through an outlet line 60. The refrigerant removes the heat of condensation as water vapor evaporated from the surface of the product condenses on the condenser. The condensate may be liquid water which will drain off of the condenser and removed from the vacuum chamber as through a drain 62. Alternatively, water vapor may condense as frost which must be periodically removed by defrosting the condenser. The condenser may also be located outside the vacuum chamber and connect to the chamber by a vacuum line 28. Generally, a condenser plate only removes water vapor and must be used in conjunction with some other device to remove air from the chamber.

Water in the seal conduits may be mechanically refrigerated in addition to being chilled by evaporation at the vacuum end. For example, still referring to FIG. 1, a pump 30 could be used so that water from the outlet water seal tank 26 flows through a heat exchanger 32 for cooling the water, with the cooled water then flowing into the water seal 29 at or through the conduit 24. Additionally or alternatively, a cooling jacket 34 may surround at least a portion of the conduit 24.

Figure 2:
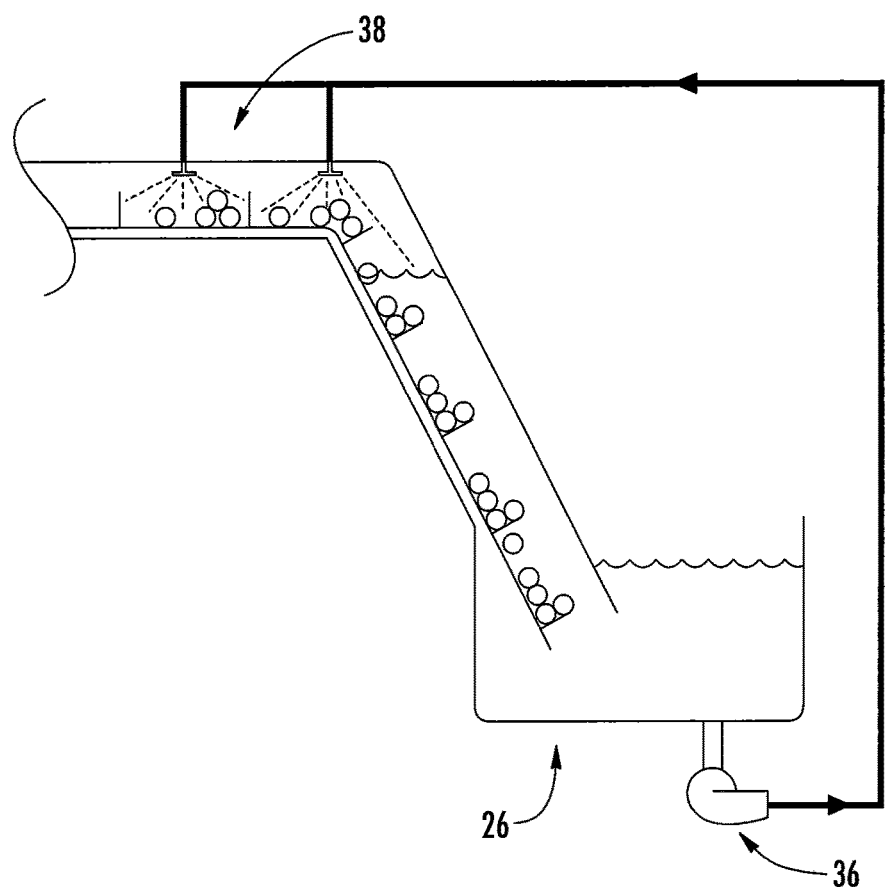
FIG. 2 schematically illustrates a portion of a vacuum chamber and an outlet water seal of the chiller system of FIG. 1 according to some embodiments.

Referring to FIG. 2, a pump 36 may be used so that water from the outlet water seal tank 26 is sent to spray nozzles 38 at or in the vacuum chamber 22. The spray nozzles 38 keep the product moist. In addition, the pump 36 and/or the spray nozzles 38 circulate the water through the outlet vacuum seal. It is contemplated that, in addition to the cooling from evaporation at the top end, such circulation may be adequate to maintain the temperature of the water substantially uniform. That is, the heat exchanger 32 and/or the cooling jacket 34 may be omitted in some embodiments.

According to some embodiments, the spray nozzles 38 may receive water from a water source other than the outlet water seal tank.

According to some embodiments, anti-microbial agents may be added to the water in one or both seals to reduce the possibility of product contamination.

Figure 5A:
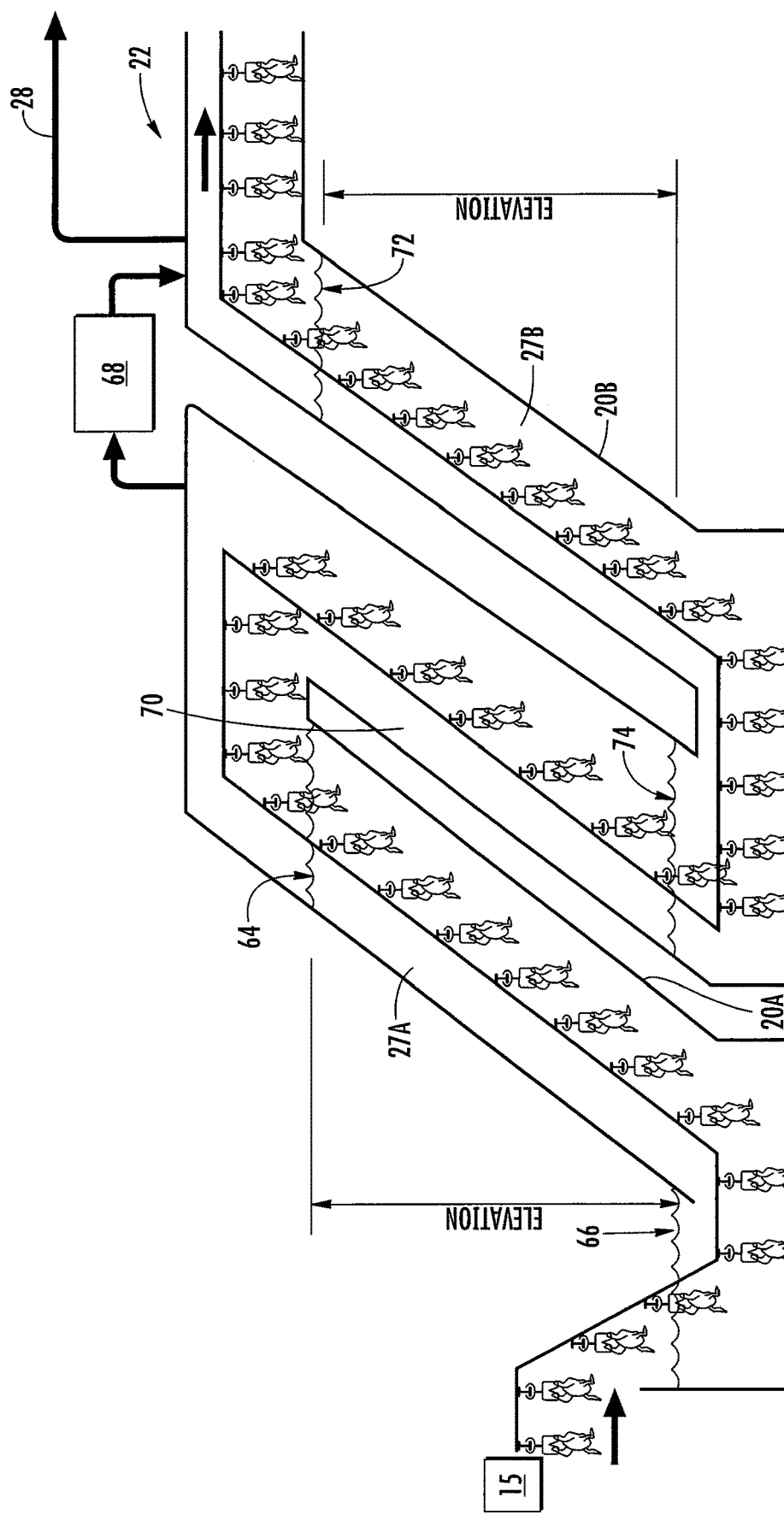
FIGS. 5A and 5B are schematic illustrations of a vacuum chiller system according to some other embodiments.

The vacuum chamber 22 or elevated portion of the system may run along the roof or in an overhead portion of the building and therefore does not take up valuable floor space. Alternatively, after exiting the inlet water seal, the vacuum portion of the chiller may be routed downwardly to a lower level. An embodiment of such downward routing might resemble the downwardly routed passageway 70 between the first and second water seal conduits of a two-stage water seal as illustrated in FIG. 5A. From such a lower level, the vacuum portion would eventually rise upwardly to enter the outlet water seal. In some other embodiments, the system may be positioned in a hole or other cavity (e.g., in the factory floor) to reduce the height of the uppermost portion of the system.

Figure 5B:
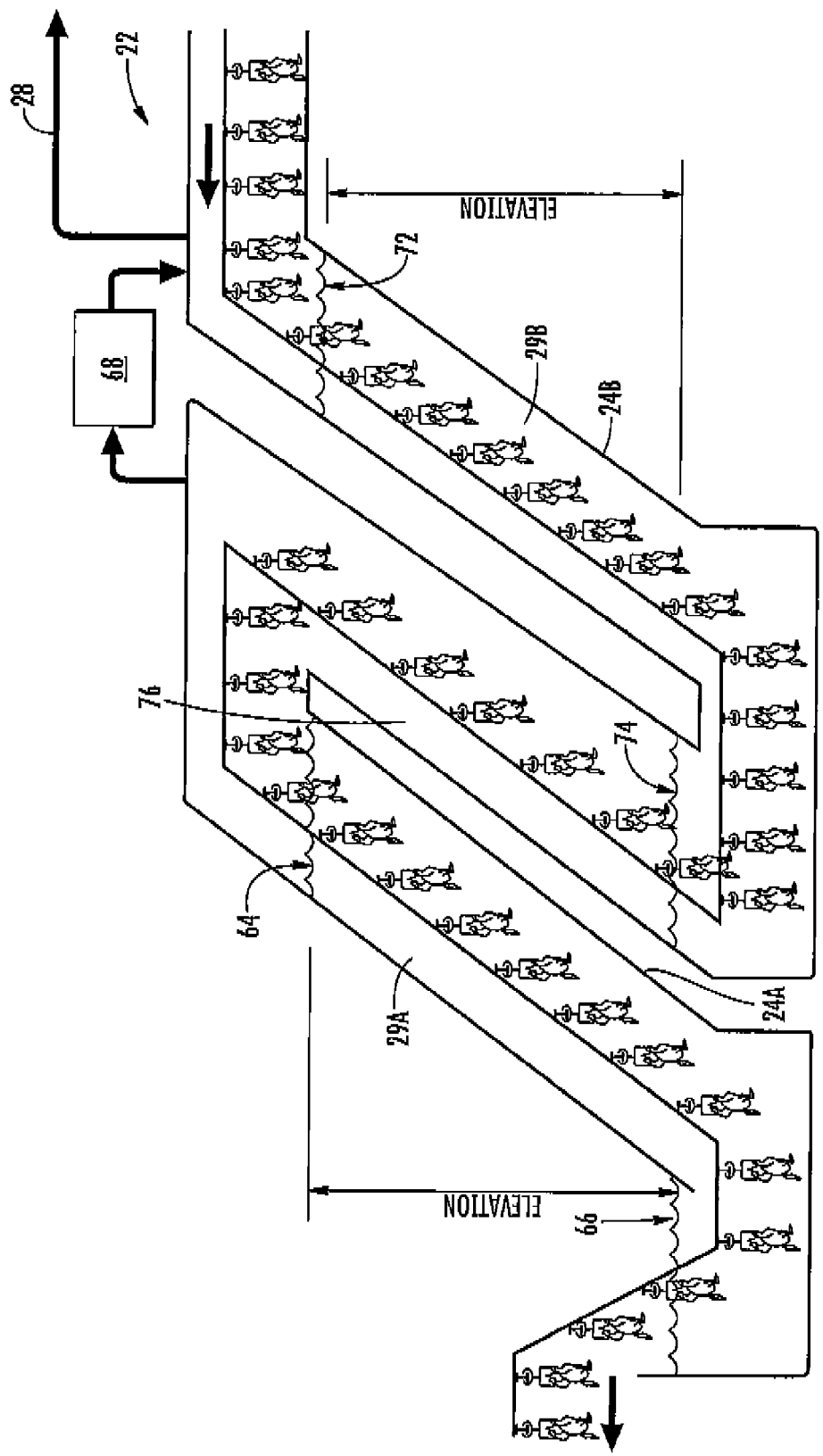

Referring to FIGS. 5A and 5B, the vacuum seals 20 and 24 may be divided into two or more stages to reduce the overall height of the system. In the case where two stages are employed, product would pass through a first stage inlet water seal 27A wherein the upper water surface 64 of the seal is elevated above the lower water surface 66 by nominally half of the 404 inch elevation difference previously noted for a single lift seal. The pressure of the atmosphere above this upper water surface is maintained at about 0.5 atmosphere of pressure by suitable vacuum devices. For example, a pressure regulator 68 is shown in FIG. 5A. Should the pressure of the atmosphere above the first inlet water seal 27A get too high, the valve will open to pass air and water vapor to the top of the second stage inlet water seal 27B where the pressure is much lower. The pressure at the top of the second stage seal is maintained as described previously.

The system may include a first inlet conduit 20A that is configured to hold the first inlet water seal 27A and a second inlet conduit 20B that is configured to hold the second inlet water seal 27B.

Product emerging from the top of the first stage seal 27A is then conveyed at constant pressure down through an intermediate conduit or passageway 70 to the inlet of the second stage of the seal 27B which is constructed much like the first stage seal 27A. The upper water level 72 of the second stage may be about 202 inches above the lower water surface 74. The atmosphere above the upper water surface of the second stage seal is at very low pressure as described previously. From this point, the process proceeds as before until the product reaches the outlet water seal.

The outlet seal consists of two stages through which product passes in reverse sequence of the 2-stage inlet seal. For example, referring to FIG. 5B, the system may include a first outlet conduit 24A configured to hold a first outlet water seal 29A and a second outlet conduit 24B configured to hold a second outlet water seal 29B. An intermediate conduit or passageway 76 generally corresponding to the conduit or passageway 70 described above is disposed between the first and second outlet conduits 24A, 24B.

In alternate embodiments, multiple seal stages may have varying elevation changes so long as the sum of the changes for all stages is approximately 404 inches.

In another embodiment, the system may be generally embodied as shown in FIG. 5A. More specifically, the system may include a first conduit 27A and a second conduit 27B with an intermediate passageway 70 disposed therebetween and communicating with each of the first and second conduits 27A, 27B. A first water seal 27A is held in the first conduit 20A and a second water seal 27B is held in the second conduit 20B. The product is conveyed up through the first conduit 20A, then down through the intermediate passageway 70, then up through the second conduit 20B, then into and through the vacuum chamber 22 for chilling. The chilled product is then conveyed out of the vacuum chamber 22 and down through the second conduit 20B, then up through the intermediate passageway 70, and then down through the first conduit 20A.

Figure 3:
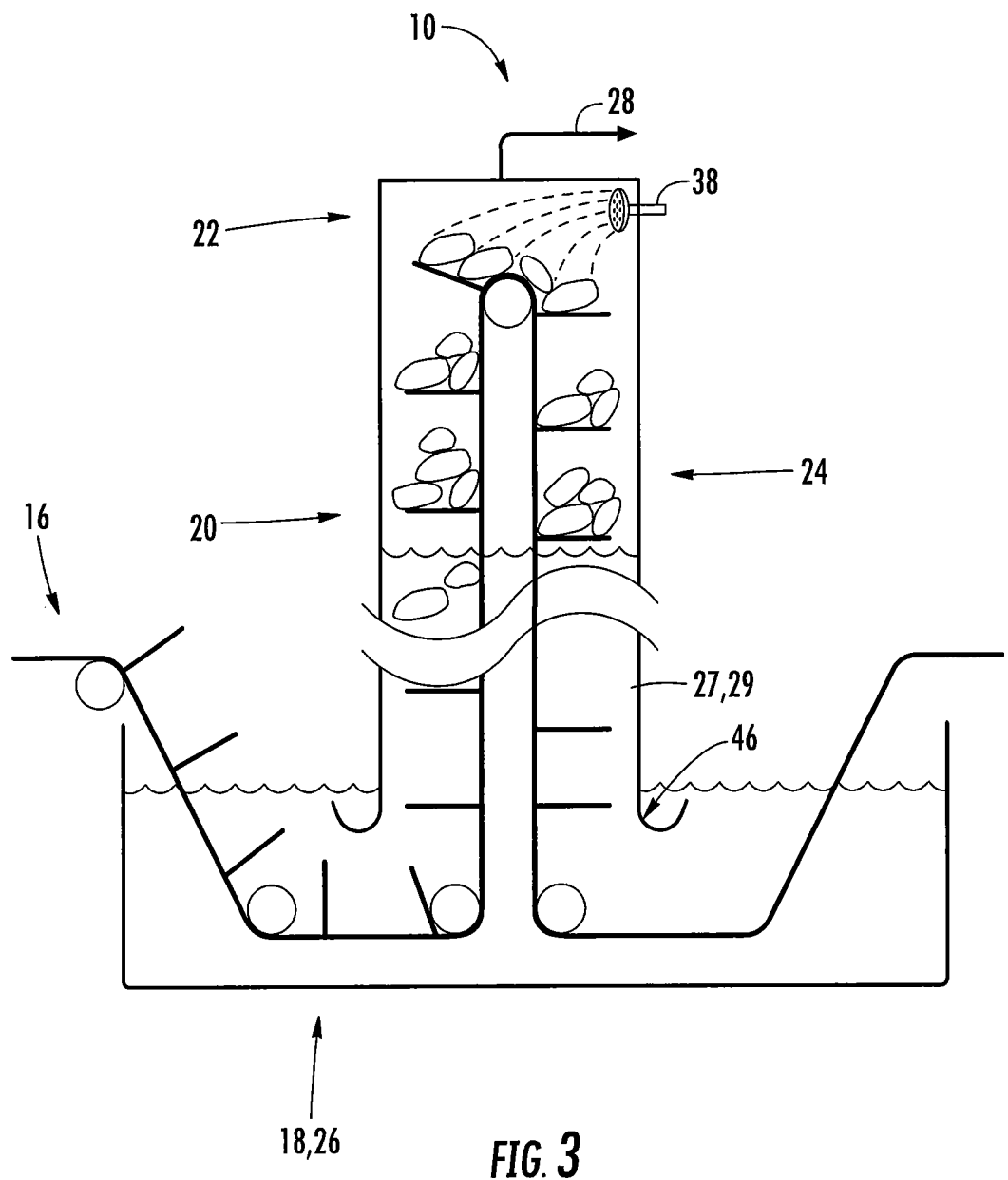
FIG. 3 is a schematic illustration of a vacuum chiller system according to some other embodiments.

Referring to FIG. 3, instead of being inclined as in FIG. 1, the inlet and outlet conduits 20, 24 may be vertical. Moreover, there may be only one water seal and only one water seal holding tank. This is illustrated in FIG. 3 with the combined tank 18, 26 and the combined water seal 27, 29.

Figure 6:
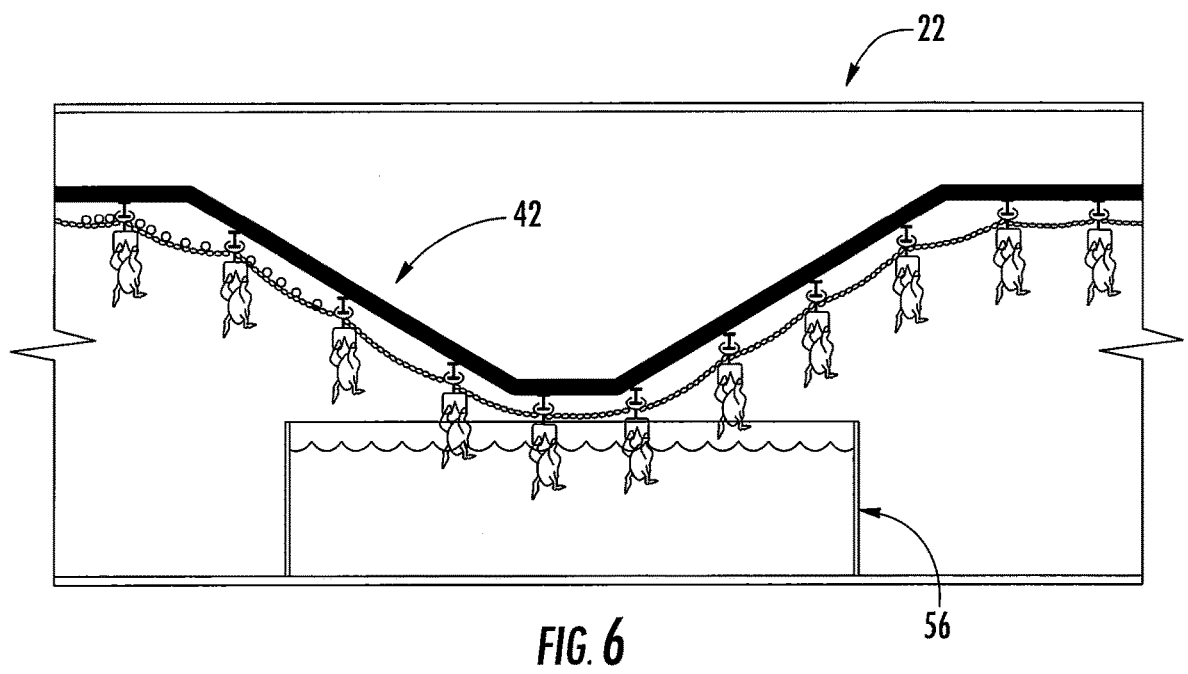
FIG. 6 is a fragmentary side section view of a vacuum chamber of the chiller system of FIG. 1 according to some embodiments.
Figure 7:
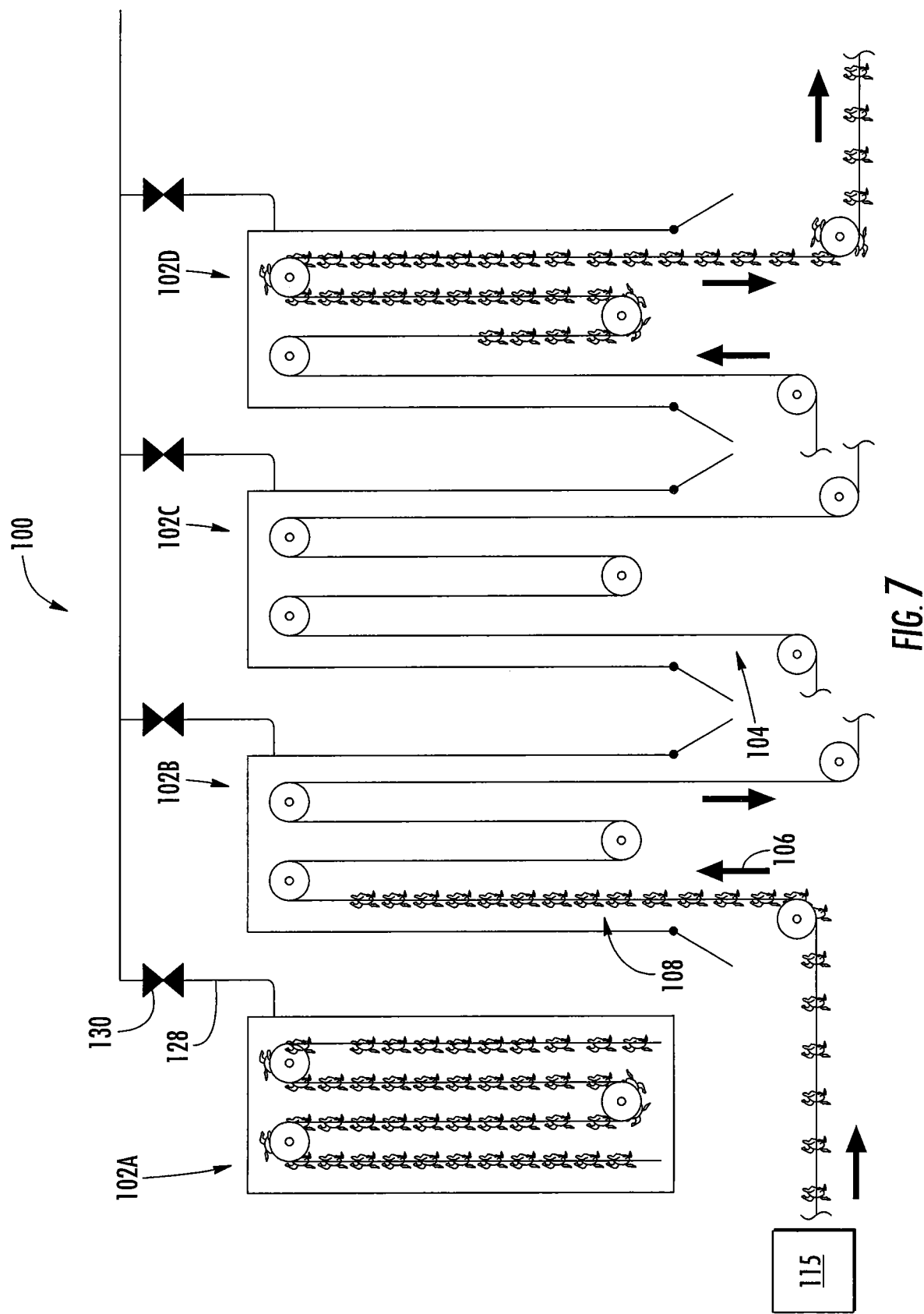
FIG. 7 is a schematic illustration of a batch vacuum chiller system according to some embodiments.

Vacuum chilling systems according to some other embodiments operate in a batch mode. Referring to FIG. 6, a batch vacuum chilling system 100 includes a plurality of vacuum chambers are sequentially loaded, evacuated, held in vacuum for a time and then unloaded.

An empty chamber 102C contains a conveying mechanism such as a shackle line 104 that has no product attached.

A vacuum chamber 102B is loaded by conveying product into the chamber. For example, when the vacuum chamber is filled, the conveying mechanism 108 (e.g., a shackle line) is directed into the chamber as indicated by arrow 106. When the chamber is filled, the conveying mechanism is disconnected from the main line or otherwise stopped and remains in the chamber. The conveyance coming from the evisceration process or poultry product source 115 is then directed into a different chamber. The filled chamber is then closed and evacuated through vacuum line 128 by opening valve 130 as shown with chamber 102A.

The evacuated chamber is held at low pressure for sufficient time to reduce the temperature of the product. When chilling in the chamber is complete, the chamber 102D is opened and the conveyor portion is reconnected to the main line or otherwise restarted so that the chilled birds may be conveyed to the next processing step.

A plurality of chambers may be provided so that they may be loaded sequentially in an approximation of a continuous process.

Provision may be made for periodically cleaning the equipment. For example, spray heads 80 (FIG. 4) may be mounted at intervals so that cleaning solution and rinse water may be applied to the interior surfaces of the vacuum chamber and seals.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

What is claimed is:

1. A system for vacuum chilling poultry product, the system comprising:
a vacuum chamber configured to be evacuated to chill poultry product in the vacuum chamber;
at least one inclined or vertical conduit coupled to the vacuum chamber, the at least one conduit configured to hold at least one water seal when the vacuum chamber is evacuated; and
a conveying mechanism that is configured to continuously convey the poultry product upwardly through the at least one conduit, then into and through the vacuum chamber, and then downwardly through the at least one conduit.

2. The system of claim 1 wherein:
the at least one conduit comprises an inclined or vertical inlet conduit at a first end portion of the system extending upwardly to the vacuum chamber and an inclined or vertical outlet conduit at a second end portion of the system extending downwardly from the vacuum chamber;
the at least one water seal comprises an inlet water seal and an outlet water seal;
the inlet conduit is configured to hold the inlet water seal when the vacuum chamber is evacuated;
the outlet conduit is configured to hold the outlet water seal when the vacuum chamber is evacuated; and
the conveying mechanism is configured to continuously convey the poultry product upwardly through the inlet conduit, then into and through the vacuum chamber, and then downwardly through the outlet conduit.

3. The system of claim 2 further comprising:
a first water seal tank at the first end portion of the system and configured to hold the inlet water seal when the vacuum chamber is evacuated; and
a second water seal tank at the second end portion of the system and configured to hold the outlet water seal when the vacuum chamber is evacuated.

4. The system of claim 3 further comprising:
a pump configured to transfer water from the second water seal tank to the outlet conduit; and
a heat exchanger configured to cool the water transferred from the second water seal tank to the outlet conduit.

5. The system of claim 2 further comprising a cooling jacket surrounding at least a portion of the inlet conduit and/or the outlet conduit to cool water held therein.

6. The system of claim 2 further comprising a pump configured to transfer water from the first or second water seal to one or more nozzles at the vacuum chamber, the one or more nozzles configured to spray the water transferred from the second water seal tank onto poultry product being conveyed through the vacuum chamber.

7. The system of claim 2 wherein:
the inlet conduit comprises a first inlet conduit and a second inlet conduit with an intermediate inlet passageway disposed therebetween and communicating with each of the first and second inlet conduits;
the inlet water seal comprises a first inlet water seal and a second inlet water seal;
the first inlet conduit is configured to hold the first inlet water seal when the intermediate inlet passageway is evacuated;
the second inlet conduit is configured to hold the second inlet water seal when the vacuum chamber is evacuated;
the outlet conduit comprises a first outlet conduit and a second outlet conduit with an intermediate outlet passageway disposed therebetween and communicating with each of the first and second outlet conduits;
the outlet water seal comprises a first outlet water seal and a second outlet water seal;
the first outlet conduit is configured to hold the first outlet water seal when the intermediate outlet passageway is evacuated;
the second outlet conduit is configured to hold the second outlet water seal when the vacuum chamber is evacuated; and
the conveying mechanism is configured to continuously convey the poultry product upwardly through the first inlet conduit, then downwardly through the intermediate inlet passageway, then upwardly through the second inlet conduit, then into and through the vacuum chamber, then downwardly through the second outlet conduit, then upwardly through the intermediate outlet passageway, and then downwardly through first outlet conduit.

8. The system of claim 7 further comprising at least one pressure regulator configured to reduce a pressure in each of the intermediate inlet and outlet passageways.

9. The system of claim 1 wherein the pressure in the vacuum chamber is controlled such that water boils at a target temperature of between 26 to 32° F.

10. The system of claim 1 further comprising a vacuum pump configured to evacuate the vacuum chamber.

11. The system of claim 10 further comprising a condenser plate configured to receive refrigerant therethrough in the vacuum chamber.

12. The system of claim 11 wherein the condenser plate is continuous or segmented and extends along at least a major portion of a length of the vacuum chamber.

13. The system of claim 1 wherein the conveying mechanism comprises a shackle line or rail supporting a plurality of shackles.

14. The system of claim 1 further comprising a dip tank for holding water in the vacuum chamber.

15. The system of claim 14 wherein the conveying mechanism conveys the poultry product downwardly in the vacuum chamber such that the poultry product passes through the water in the dip tank.

16. The system of claim 1 further comprising a poultry product source comprising poultry product that is configured to be received on the conveying member.

17. The system of claim 1 wherein:
the at least one conduit comprises a first conduit and a second conduit with an intermediate passageway disposed therebetween and communicating with each of the first and second inlet conduits;
the at least one water seal comprises a first water seal and a second water seal;
the first conduit is configured to hold the first water seal when the intermediate passageway is evacuated;
the second conduit is configured to hold the second water seal when the vacuum chamber is evacuated; and
the conveying mechanism is configured to continuously convey the poultry product upwardly through the first conduit, then downwardly through the intermediate passageway, then upwardly through the second conduit, then into and through the vacuum chamber, then downwardly through the second conduit, then upwardly through the intermediate passageway, and then downwardly through first conduit.

18. A method for vacuum chilling poultry product in a continuous mode, the method comprising:
evacuating a vacuum chamber;
conveying the poultry product up at least one inclined or vertical inlet conduit holding at least one water seal; then
conveying the poultry product into and through the vacuum chamber that is coupled to the at least one conduit to chill the poultry product; and then
conveying the chilled poultry product down the at least one conduit.

19. The method of claim 18 wherein:
the at least one conduit comprises an inclined or vertical inlet conduit extending upwardly to the vacuum chamber and an inclined or vertical outlet conduit extending downwardly from the vacuum chamber;
the at least one water seal comprises an inlet water seal held in the inlet conduit and an outlet water seal held in the outlet conduit; and
the method comprises:
conveying the poultry product up the inlet conduit; then
conveying the poultry product into and through the vacuum chamber; and then
conveying the chilled poultry product down the outlet conduit.

20. The method of claim 19 further comprising:
conveying the poultry product through an inlet water seal tank holding the inlet water seal before conveying the poultry product up the inlet conduit; and
conveying the chilled poultry product through an outlet water seal tank holding the outlet water seal after conveying the poultry product down the outlet conduit.

21. The method of claim 20 further comprising:
pumping water from the outlet water seal tank to the outlet conduit; and
flowing the water through a heat exchanger between the outlet water seal tank and the outlet conduit to cool the water.

22. The method of claim 20 or 21 further comprising:
pumping water from the outlet water seal tank to one or more spray nozzles at the vacuum chamber; and
spraying the water from the one or more spray nozzles onto the poultry product in the vacuum chamber.

23. The method of claim 18 further comprising maintaining the pressure in the vacuum chamber such that water boils at a target temperature of between 26 to 32° F.

24. The method of claim 19 wherein:
the inlet conduit comprises a first inlet conduit and a second inlet conduit with an intermediate inlet passageway disposed therebetween and communicating with each of the first and second inlet conduits;
the inlet water seal comprises a first inlet water seal held in the first inlet conduit and a second inlet water seal held in the second inlet conduit;
the outlet conduit comprises a first outlet conduit and a second outlet conduit with an intermediate outlet passageway disposed therebetween and communicating with each of the first and second outlet conduits;
the outlet water seal comprises a first outlet water seal held in the first outlet conduit and a second outlet water seal held in the second outlet conduit;
the method comprises:
conveying the poultry product up through the first inlet conduit; then
conveying the poultry product down through the intermediate inlet passageway; then
conveying the poultry product up through the second inlet conduit; then
conveying the poultry product into and through the vacuum chamber; then
conveying the chilled poultry product down through the second outlet conduit; then
conveying the chilled poultry product up through the intermediate outlet passageway; and then
conveying the chilled poultry product down through first outlet conduit.

25. The method of claim 18 wherein:
the at least one conduit comprises a first conduit and a second conduit with an intermediate passageway disposed therebetween and communicating with each of the first and second inlet conduits;
the at least one water seal comprises a first water seal held in the first conduit and a second water seal held in the second conduit; and
the method comprises:
conveying the poultry product up through the first conduit; then conveying the poultry product down through the intermediate passageway; then conveying the poultry product up through the second conduit; then conveying the poultry product into and through the vacuum chamber; then conveying the chilled poultry product down through the second conduit; then conveying the chilled poultry product up through the intermediate passageway; and then conveying the chilled poultry product down through the first conduit.

26. A method for vacuum chilling poultry product in a batch mode, the method comprising:

providing a vacuum chilling system comprising:
- a poultry product source;
- a plurality of vacuum chambers comprising first and second vacuum chambers; and
- a shackle line configured to convey poultry product from the poultry product source into and through each of the plurality of vacuum chambers;

routing poultry product from the poultry product source into the first vacuum chamber using the shackle line;

closing the first vacuum chamber to seal the first vacuum chamber and enclose the poultry product in the first vacuum chamber;

evacuating the first vacuum chamber to vacuum chill the poultry product in the first vacuum chamber;

while evacuating the first vacuum chamber, routing poultry product from the poultry source into the second vacuum chamber using the shackle line; and evacuating the second vacuum chamber to vacuum chill the poultry product in the second vacuum chamber.

27. The method of claim 26, further comprising, after the poultry product in the first vacuum chamber has been chilled to a predetermined temperature:

opening the first vacuum chamber; and routing the chilled poultry product away from the first vacuum chamber using the shackle line.

28. The method of claim 27 wherein the predetermined temperature is less than about 36° F.

29. The method of claim 27 wherein the steps of evacuating the second vacuum chamber and routing the chilled poultry product away from the first vacuum chamber are performed concurrently.

\* \* \* \* \*

UNITED STATES PATENT AND TRADEMARK OFFICE
CERTIFICATE OF CORRECTION

PATENT NO. : 10,653,157 B2
APPLICATION NO. : 16/302176
DATED : May 19, 2020
INVENTOR(S) : John P. Shell Page 1 of 1

It is certified that error appears in the above-identified patent and that said Letters Patent is hereby corrected as shown below:

In the Claims

Column 14, Line 19, Claim 22:
Please correct "claim 20 or 21" to read -- claim 20 --

Signed and Sealed this
Twentieth Day of October, 2020

Andrei Iancu
*Director of the United States Patent and Trademark Office*